United States Patent

Karpov et al.

[11] Patent Number: 5,892,223
[45] Date of Patent: Apr. 6, 1999

[54] MULTILAYER MICROTIP PROBE AND METHOD

[75] Inventors: Elijah Karpov, Salem, Oreg.; Jack Linn; Richard Belcher, both of Melbourne, Fla.

[73] Assignee: Harris Corporation, Melbourne, Fla.

[21] Appl. No.: 885,897

[22] Filed: Jun. 30, 1997

[51] Int. Cl.⁶ .................................................. H01J 37/26
[52] U.S. Cl. .............................................. 250/306; 73/105
[58] Field of Search ................................ 250/306; 73/105

[56] References Cited

U.S. PATENT DOCUMENTS

| | | | |
|---|---|---|---|
| 5,166,520 | 11/1992 | Prater et al. | 250/306 |
| 5,218,757 | 6/1993 | Kaneko et al. | 29/855 |
| 5,245,187 | 9/1993 | Kawase et al. | 250/306 |
| 5,270,543 | 12/1993 | Visser et al. | 250/306 |
| 5,353,632 | 10/1994 | Nakagawa | 250/306 |
| 5,357,109 | 10/1994 | Kusumoto | 250/306 |
| 5,386,110 | 1/1995 | Toda | 250/216 |
| 5,393,647 | 2/1995 | Neukermans et al. | 430/320 |
| 5,406,123 | 4/1995 | Narayan | 257/767 |
| 5,455,419 | 10/1995 | Bayer et al. | 250/423 F |
| 5,508,627 | 4/1996 | Patterson | 324/752 |
| 5,546,375 | 8/1996 | Shimada et al. | 369/126 |
| 5,548,117 | 8/1996 | Nakagawa | 250/423 F |

*Primary Examiner*—Jack I. Berman
*Attorney, Agent, or Firm*—Rogers & Killeen

[57] ABSTRACT

A multilayer microtip probe, and method of manufacture, having a microtip prepared for adhesion of a first overlayer for determining probe operating properties and a hardened protective overlayer for improving resistance to erosion and wear during probe use.

21 Claims, 1 Drawing Sheet

MULTILAYER MICROTIP PROBE AND METHOD

BACKGROUND OF THE INVENTION

The present invention relates to an improved microtip probe, and a method of manufacture for microscopy uses such as scanning probe microscopy ("SPM"). More particularly, the present invention addresses a need to provide microtip probes with operating properties and shapes complimenting the probe's intended use. Further the present invention extends a probe's life by improving the probe's wear resistance, e.g., erosion resistance.

Microscopy probes desirably consist of a microtip shaped for a particular application. U.S. Pat. No. 5,546,375 to Shimada, et al., discloses a method of manufacturing a cantilevered noble metal microtip for a scanning tunneling microscope. While the Shimada noble metal microtip achieves surface observation at an atomic or molecular-scale resolution, noble metals are not highly wear resistant. U.S. Pat. No. 5,386,110 to Toda, discloses a method of making a cantilever chip for a SPM probe having an undoped silicon microtip. Toda relies on the selective use of different microtip shapes in order to measure samples having various shapes.

Prior art manufacturing methods also include the deposition of a gold or cobalt/chromium layer on shaped silicon microtips or the use of doped diamond microtips. The prior art metal coating suffers from low reliability due to microtip wear, especially in applications requiring the microtip to contact the probed surface. Doped diamond microtips may present an excessively hard tip for some applications and also suffer from having a high resistivity and therefore are not suitable for high frequency electrical response applications.

The present invention provides an improvement over the prior art by enhancing and tailoring probe operating properties and extending probe life through the use of a shaped microtip with a novel multilayer microtip treatment.

Accordingly, it is an object of the present invention to provide a novel method of manufacturing a multilayer probe microtip having selectable operating properties during manufacture and enhanced wear resistance during use.

It is another object of the present invention to provide a novel method of overlying a microtip with a layer to obtain selected microtip operating properties and subsequently applying a protective layer resistive to wear without adversely affecting said microtip shape and operation.

It is yet another object of the present invention to provide a novel method of preparing a microtip for adhesion of an overlayer by first chemically treating the microtip.

It is still another object of the present invention to provide a novel method of preparing a microtip to bond an overlayer by depositing an adhesive layer to the microtip surface.

It is a further object of the present invention to provide a novel scanning probe microscopy microtip having selected operating properties using a paramagnetic and/or selected conductivity overlayer.

It is yet a further object of the present invention to provide a novel and improved scanning probe microscopy microtip using a final hardened overlayer to reduce microtip wear during probe use.

It is still a further object of the present invention to provide a novel microtip having an overlayer directed to provide the microtip with specific resistive and/or magnetic properties during operation with improved wear characteristics resulting from a protective overlayer.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
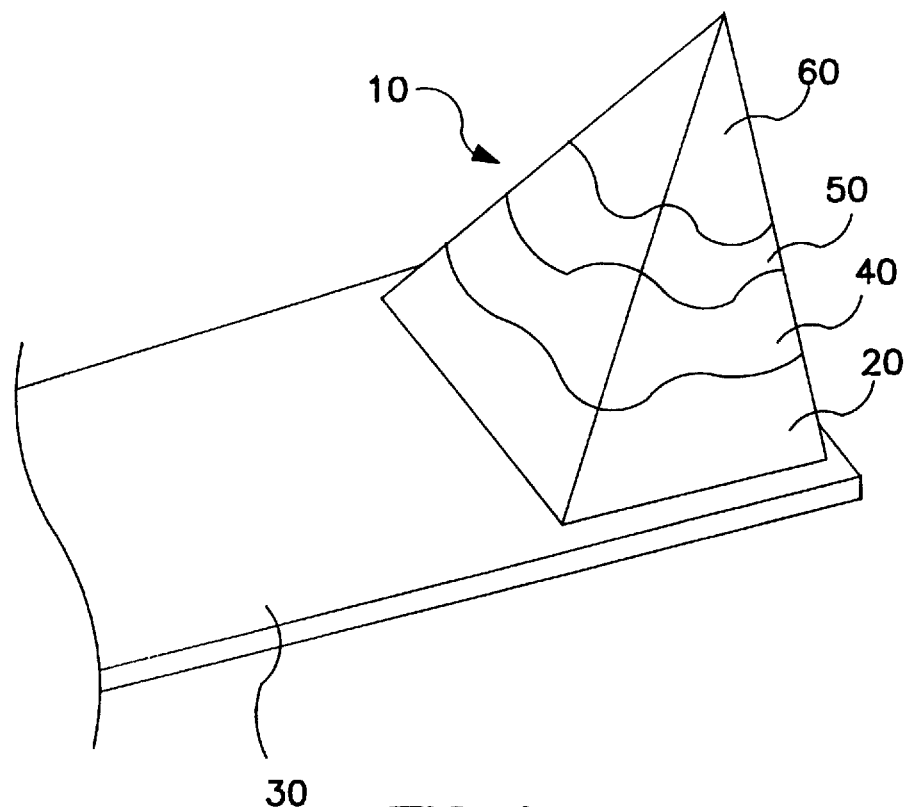
FIG. 1 illustrates a microtip probe.

With reference to FIG. 1, the present invention relates to microtip probe 10. Microtip probe 10 comprises microtip 20 on probe substrate 30. Microtip 20 is manufactured in a shape appropriate for the probe's intended application. Typically, microtip 20 is fabricated from a silicon crystal. Microtip 20 may extend edge-to-edge on probe substrate 30 or may be set within probe substrate 30 as shown by FIG. 1.

Figure 2:
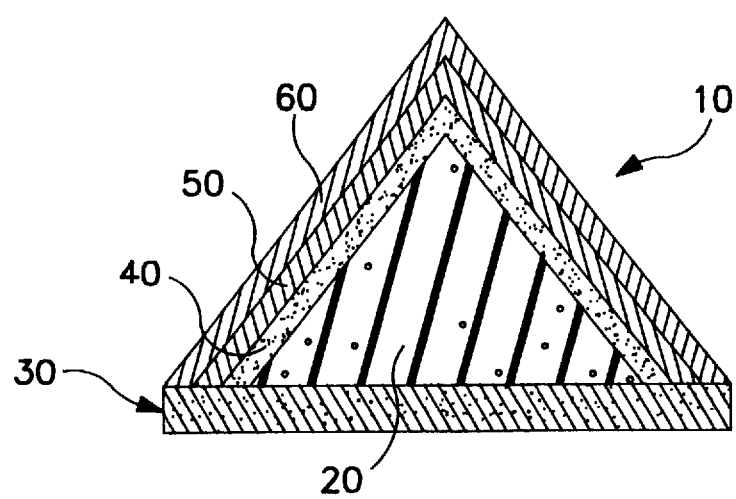
FIG. 2 is a cross-sectional view of the FIG. 1 probe.

With additional reference to FIG. 2, a cross-section view of the FIG. 1 probe, an embodiment of the present invention is a method of manufacturing a multilayer probe microtip. Using conventional methods, probe microtip 20 having a desired size and geometry is manufactured.

Microtip 20 is prepared for adhesion of first overlayer 50. Preparation of microtip 20 to provide a suitable adhesive surface may include chemical treatment such as plasma cleaning or wet chemical cleans using piranha, a cleaning solution which is a mixture of sulfuric acid and peroxide in equal parts. Optionally, microtip 20 adhesion may be improved by deposition of an adhesive layer 40, e.g., sputtering. An adhesive layer 40 material must itself adhere to silicon and must also provide a surface conducive for the adhesion of first overlayer 50. The method of the invention has found that the use of aluminum, chromium, nickel, titanium, and alloys thereof are suitable in depositing adhesive layer 40.

The selection of material for use as first overlayer 50 may determine probe 10 operating properties. Use of a paramagnetic metal or a material polarized with the application of an applied voltage may desirably obtain a microtip magnetic operating property. First overlayer 50 material may desirably include iron, nickel, cobalt, and alloys thereof to provide magnetic probe characteristics.

First overlayer 50 may serve as a conductive layer. Probes having a specific conductivity/resistivity are obtained by selecting first overlayer 50 material having an appropriate conductivity/resistivity, tungsten being resistive, titanium being less resistive, and molybdenum being even less resistive. Additional conductive materials suitable for use as first overlayer 50 material include silver, gold, chromium, platinum, palladium, cobalt, nickel, and copper as well as alloys thereof. Microtip bias and current may be influenced and accordingly maintained within desired ranges by the selection and concentration of first overlayer 50 material applied to microtip 20.

The method of the present invention extends probe 10 life by inclusion of an erosion wear protection layer 60 comprising compounds of titanium nitride (TiN), titanium tungsten nitride (TiWN), chromium nitride (CrN), tungsten nitride (WN), or nitrides of titanium, tungsten, and chromium. Preferentially, titanium nitride (TiN) or titanium tungsten nitride (TiWN) are used for protective layer 60. Protective layer 60 is applied over first overlayer 50 so as to form a hardened protective layer resistive to wear without adversely affecting microtip shape. Thicknesses of less than 1,000 angstroms are effective with thickness less than approximately 500 angstroms being preferred.

Successive layers may cover less than the entire microtip as shown in FIG. 1 or may cover the entire microtip as shown in FIG. 2.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of manufacturing an improved scanning probe microscopy microtip having selected operating properties and an enhanced resistance to wear, comprising the steps of:

a) providing a silicon microtip of a desired shape;

b) preparing said microtip for adhesion of an overlying layer;

c) applying an overlying layer to obtain final selected microtip operating properties; and d) without adversely affecting said microtip shape, applying a protective layer resistive to wear overlying said overlying layer.

2. The method of claim 1 wherein preparing said microtip for adhesion comprises chemically treating microtip.

3. The method of claim 1 wherein preparing said microtip comprises depositing an adhesive layer.

4. The method of claim 3 wherein applying said overlying layer comprises using a paramagnetic metal to obtain a desired microtip magnetic operating property.

5. The method of claim 3 wherein applying said overlying layer comprises selecting a conductive material to provide a selected final microtip conductivity.

6. The method of claim 5 wherein applying a protective layer comprises applying one of the group comprising titanium nitride, titanium tungsten nitride, chromium nitride, tungsten nitride, or nitrides of titanium, tungsten, and chromium.

7. The method of claim 6 wherein said protective layer is applied with a thickness of less than approximately 500 angstroms.

8. A multilayer microtip probe with improved wear properties comprising:

a shaped silicon probe microtip;

an adhesive layer contacting said microtip;

a conductive layer overlying said adhesive layer; and a protective layer overlying said conductive layer.

9. The probe of claim 8, wherein said adhesive layer comprises one of the group of chromium, aluminum, nickel, and titanium, or an alloy thereof.

10. The probe of claim 9, wherein said conductive layer comprises paramagnetic metal.

11. The probe of claim 9, wherein said conductive layer comprises a material polarized with applied voltage.

12. The probe of claim 9, wherein said conductive layer comprises a low resistance material.

13. The probe of claim 8, where said conductive layer comprises one of the group of silver, gold, chromium, platinum, palladium, cobalt, nickel, tungsten, titanium, molybdenum, and copper, or an alloy thereof.

14. The probe of claim 8, wherein said protective layer comprises one of TiN or TiWN.

15. The probe of claim 14, wherein said protective layer thickness is less than 1000 angstroms.

16. A method of manufacturing a multilayer probe microtip having operating properties selectably determined during manufacture and enhanced erosion resistance during probe use, comprising the steps of:

a) forming a microtip having a desired size and geometry;

b) overlying a first layer upon said microtip to provide said microtip with specific operating properties; and c) overlying said first layer with a protective material sufficiently thick to enhance said microtip erosion resistance without adversely affecting said microtip geometry.

17. The method of claim 16 further wherein step a) further comprises the steps of:

a1) forming said microtip from a silicon substrate; and a2) preparing said microtip for adhesion of said first layer.

18. The method of claim 17 wherein step a2) further comprises depositing an adhesive layer upon said microtip.

19. The method of claim 16 wherein overlying a first layer comprises using a paramagnetic material.

20. The method of claim 16 wherein overlying a first layer provides said microtip with a selected conductivity.

21. The method of claim 16 wherein overlying said first layer with a protective layer comprises using one of TiN or TiWN.

* * * * *